United States Patent [19]
Takeda

[11] 3,849,643
[45] Nov. 19, 1974

[54] AUTOMATIC FOCUSING APPARATUS

[75] Inventor: Hideomi Takeda, Tokyo, Japan

[73] Assignee: Asahi Kogahu Kagyo Kabushiki Kaisha, Tokyo, Japan

[22] Filed: Nov. 29, 1973

[21] Appl. No.: 420,293

[30] Foreign Application Priority Data
Nov. 30, 1972 Japan.............................. 47-120244

[52] U.S. Cl.................. 250/201, 95/44 C, 352/140
[51] Int. Cl............................ G01j 1/20, G03b 3/00
[58] Field of Search ...... 250/201; 95/44 C; 352/140

[56] References Cited
UNITED STATES PATENTS

| | | | |
|---|---|---|---|
| 3,450,018 | 6/1969 | John, Jr. .......................... | 352/140 X |
| 3,781,110 | 12/1973 | Leitz et al...................... | 250/201 X |

*Primary Examiner*—James W. Lawrence
*Assistant Examiner*—T. N. Grigsby
*Attorney, Agent, or Firm*—Christie, Parker & Hale

[57] ABSTRACT

An image is formed on a plane by light passing through a lens. The lens and the plane are movable relative to each other so as to focus the image. A two-dimensional diffraction grating, preferably of the phase grating type, is disposed in the optical path at a distance spaced away from the plane. A scanning mechanism is provided including a plate disposed between the diffraction grating and the plane, and having a slit therethrough. Light passing through the diffraction grating and through the slit impinges upon a photoelectric element, preferably a CdS cell exhibiting a dip effect, which provides an electrical signal used in a positioning mechanism that provides for maximizing the contrast of the image formed by the light passing through the diffraction grating and impinging on the photoelectric element so as to bring the image into focus.

5 Claims, 9 Drawing Figures

AUTOMATIC FOCUSING APPARATUS

CROSS-REFERENCES TO RELATED APPLICATIONS

Application Ser. No. 403,534, filed Oct. 9, 1973 entitled AUTOMATIC FOCUS ADJUSTMENT MEANS, by Harumi Aoki and Takuo Itagaki, and assigned to the assignee of this invention, is directed to an arrangement including a selfscan type photoelectric element. Application Ser. No. 412,457, filed Nov. 2, 1973, entitled AUTOMATIC FOCUSING DEVICE, by Hideomi Takeda and Harumi Kawasaki, and assigned to the assignee of this invention, is directed to a focusing device including a diffraction grating optical filter. The disclosures of these applications are hereby incorporated by reference herein.

BACKGROUND OF THE INVENTION

This invention relates to automatic focusing apparatus.

Automatic focusing has already been achieved in the camera art. Generally, the spacing between an image-forming lens and the image plane is adjusted so as to maximize the degree of contrast in the image. This of course requires some means for sensing and indicating the degree of contrast.

A well-known approach involves the use of an image pickup tube for scanning of the image formed on the image plane. The image tube provides an electrical signal whose value depends upon whether the image is in or out of focus. With this approach, all the spatial frequency components contained in the image are detected. It is theoretically known, however, that the reduction in image contrast caused by defocusing an optical image increases in general at higher spatial frequencies. Furthermore, the image contrast is nothing but the OTF (Optical Transmission Function) of the associating optical system, and the reduction in the OTF caused by defocusing is spatial frequency dependent, being much larger at higher frequencies. An improved defocusing sensitivity may therefore be attained by extracting high-frequency components to compare them with each other. On the basis of this fact a method has been proposed, wherein the time signal obtained by scanning the light quantity distribution in the image is electrically frequency-analyzed so as thereby to extract high-frequency components. However, several difficulties are encountered in putting this method into practice, because it requires a large scale and expensive apparatus which is provided with a complicated device such as a filter circuit or the like.

In another known approach, there is provided a semiconductor light sensitive element that exhibits a dip effect. That is, its electrical characteristics provide a local peak so as to identify an in-focus position. Adhered to the light sensitive element there is a grating-like mask. Typically the mask consists of a glass plate having non-transmissible parts arranged on it. This mask is of the amplitude type and provides merely a multiplication of the light intensity distributions in the optical image and the grating-like mask. A significant disadvantage is that the OTF of this mask cannot be decided definitely.

SUMMARY OF THE INVENTION

This invention provides a high-precision automatic focusing device through the combined use of a diffraction grating which serves as a high-pass filter and a scanning mechanism.

In contrast to the approach whereby an image tube is used the present invention provides for detection of the more significant high-frequency spatial frequency components of an image. In contrast to the approach whereby a grating-like mask is used, the present invention provides not merely a multiplication of intensity distributions but rather a true optical transmission function spatial frequency filter.

The apparatus of this invention includes means, including a lens, defining an optical path such that at least a portion of light passing through the lens impinges upon a plane. The lens and the plane are movable relative to each other in either of two opposite directions along the optical path. Preferably, the optical path is defined in part by a reflex mirror that reflects light at a right angle with respect to the optical axis of the lens.

A focusing control signal is produced by means of a photoelectric element responsive to light impinging on the plane. The control signal varies in accordance with the degree of contrast in the impinging light. The degree of contrast is maximum for an in-focus spacing between the lens and the plane.

Significantly, the apparatus includes in combination an optical transmission function filter and a scanning mechanism that together provide for increasing the difference between the degree of contrast obtained at an in-focus spacing and the degree of contrast obtained at an out-of-focus spacing. The filter comprises a diffraction grating, preferably of the phase grating type, disposed in the optical path and spaced from both the lens and the plane. The scanning mechanism includes oscillating means and a plate disposed between the diffraction grating and the plane and having a slit therethrough. Preferably the plate rotates responsive to the oscillating means. Means responsive to the control signal provide for adjusting the spacing between the lens and the plane to a relative spacing that maximizes the degree of contrast.

DETAILED DESCRIPTION

General Description

Figure 1:
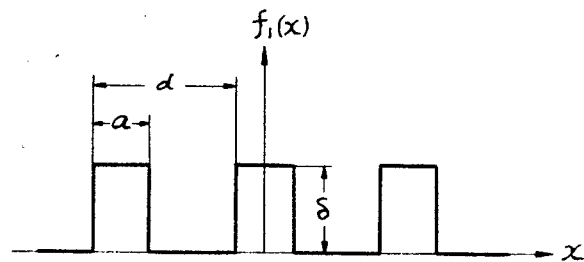
FIG. 1 is a graph illustrating the transmission factor of a phase grating.

Before describing an automatic focusing device according to one embodiment of this invention, the discussion will be directed first, for convenience of illustration, to the improvement in the OTF of an image-forming system which is attained by use of a diffraction grating. According to this invention the diffraction grating may be a phase grating, amplitude grating or complex amplitude grating. However, the description will be made herein exclusively in connection with a phase grating having such a transmission factor distribution $f_1(x)$ as represented by Formula (1). It should also be noted that all the Formulas shown below are, for simplicity of illustration, expressed in connection with the one-dimension.

$$f_1(x) = \begin{cases} \frac{\exp(i\delta)}{1} & |x| \leq \frac{a}{2} \\ & \frac{a}{2} \leq |x| \leq \frac{d}{2} \end{cases} \quad (1)$$

where, $\delta$ is the phase difference, $a$ is the tooth width and $d$ is the phase pitch. The transmission factor $f_1(x)$ of this phase grating is graphically shown in FIG. 1. When the phase grating 1 is interposed between a camera lens 2 and a film surface 3, and the pupil function of the lens 1 is represented by $f_0(x)$, then the OTF $R(u)$ ($u$ is the spatial frequency) of the optical system will be expressed as follows:

$$R(u) = (f_0 \cdot f_1) \circledast (f_0 \cdot f_1)^\dagger \quad (2)$$

where, marks $\circledast$ and $\dagger$ represent an autocorrelation function and a complex conjugate, respectively. If the OTF of the lens and the OTF of the phase grating are represented by $R_0(u)$ and $R_1(u)$ respectively, then $R(u)$ can be approximated by a product of $R_0 \cdot R_1$. When $\delta$ is equal to $\pi$, $R_1(u)$ can be expressed as $$R_1(u) = q\left(\frac{a}{\lambda b}, u\right) * \sum_{n=-\infty}^{\infty} \delta\left(u - \frac{nd}{b}\right) \quad (3)$$

where, $q(B, u)$ is a triangular wave function having a band width of 2B and a height of 1, $\delta(u - nd/\lambda^b)$ b) represents an impulse at $u = nd/\lambda^b$, the mark * represents a convolution integral, $b$ is the distance between the phase grating and the image surface and $\lambda$ is the wavelength of the light.

Figure 3:
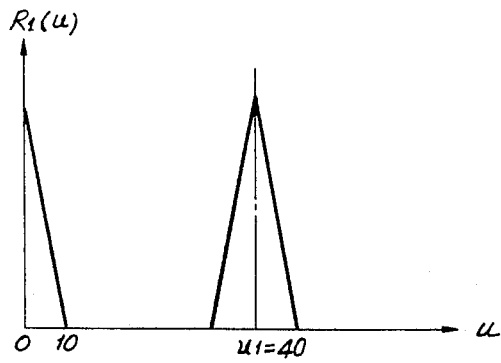
FIG. 3 is a graph plotting the optical transfer function $R_1(u)$ of the phase grating, wherein the spatial frequency $u$ (pcs/mm) is taken as abscissa.

FIG. 3 illustrates the OTF $R_1(u)$ of the phase grating at the time when $d = 1.2$mm, $a = 0.3$mm, $\lambda = 0.5\mu$ and $b = 60$mm. It is well-known that the OTF $R_0(u)$ of the lens can be represented by a curve which attenuates increasingly moderately at higher frequencies. The OTF $R(u)$ of the optical system consisted of the grating and the lens will, therefore, have a band-pass characteristic just as $R_1(u)$. It is true that there exist side bands where $u_2$ exceeds 80 pic/mm. However, since the OTF $R_0(u)$ of a camera lens, for example, is considerably deteriorated at such high-frequencies, then it will be sufficient for the purpose of this invention that the positive and negative primary frequency bands alone be taken into consideration.

Figure 4:
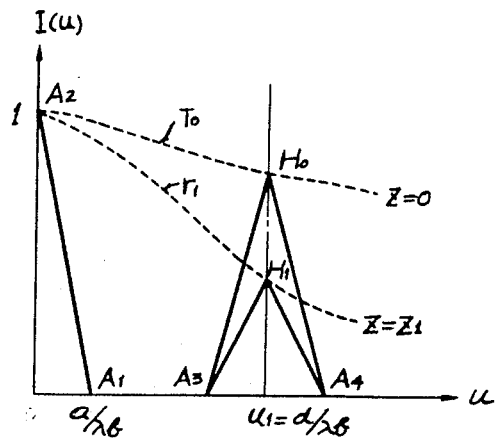
FIG. 4 is a graph showing the power spectrum $I(u)$ of the image filtered by the phase grating.

It will now be understood that the optical system with an OTF which has been improved by use of a grating is provided with an effect equivalent to that of a bandpass filter. Illustrated in FIG. 4 is the power spectrum $I(u)$ of the image of an object to be photographed which is represented by the product of the power spectrum of the object and the OTF $R(u)$. In this Figure the triangular wave functions $\Delta OA_1A_2$ and $\Delta A_3H_0A_4$ represent the OTF $R(u)$ which has been improved by the phase grating, and curves $r_0$ and $r_1$ represent the power spectrum of the object image obtained at the time when the phase grating is not used at the focusing position ($z = 0$) and a defocusing position ($z = z_1$), respectively. When the phase grating is inserted, the power spectra of the image obtained at the focusing position and a defocusing position can therefore be represented by a triangular wave function $\Delta OA_1A_2$ which is the common DC component and by triangular wave functions $\Delta A_3 H_0 A_4$ and $\Delta A_3 H_1 A_4$, respectively, which are high-frequency components. It will now be appreciated that the square wave type phase grating is provided with an effect of a band-pass filter.

This invention contemplates that the object image having filtered by said optical system with an improved OTF is converted into a time signal by scanning it with a slit, and then a signal portion which is equivalent to the high spatial frequency component shown in FIG. 4 is extracted by a high-pass filter circuit to thereby detect the maximum value of the band-pass output of said signal portion. A discussion will be set forth hereinafter to the effect that a higher sensitivity can be obtained when the defocusing detection is effected by extracting only specific spatial frequency components than when the defocusing detection is carried out over the entire spatial frequencies.

Figure 5:
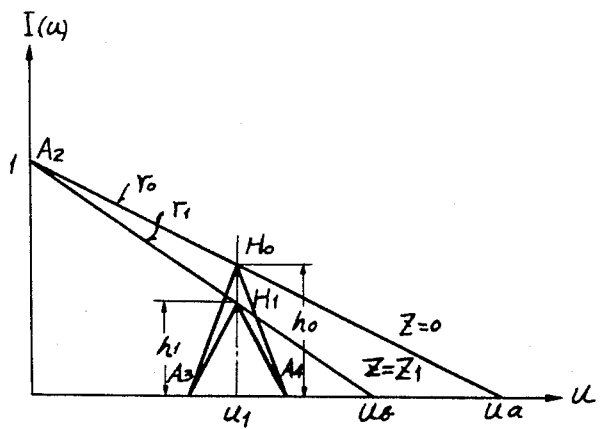
FIG. 5 is a graph that is helpful in explaining by comparison the defocusing detection sensitivity attained at the time when a detecting operation is carried out over the entire spatial frequencies and the detection sensitivity at a time when a particular spatial frequency component alone is selectively detected.

In FIG. 5 it is assumed, for simplicity, that the spectra of the object image obtained at a time when no phase grating is inserted at the focusing position ($z = 0$) and a defocusing position ($z = z_1$) are approximated by straight lines $r_0$ and $r_1$ respectively, of which cut-off frequencies are $u_a$ and $u_b$ respectively. The triangular wave functions $\Delta A_3 H_0 A_4$ and $\Delta A_3 H_1 A_4$ represent the spectra obtained at the focusing and defocusing positions respectively when a low frequency component ($\Delta OA_1A_2$ in FIG. 4) has been removed from the signal which had been bandpass-filtered by use of a phase grating. It is also assumed that the center frequency of the band-pass signal is $u_1$, the heights of the triangular wave functions at the focusing and defocusing positions are $h_0$ and $h_1$. In FIG. 5 the areas $S_0 = \Delta Ou_aA_2$ and $S_1 = \Delta Ou_bA_2$ defined by the power spectrum curve represent the overall light fluxes detected at the focusing and defocusing positions, respectively, when no phase grating is inserted. Areas $S_0' = \Delta A_3 H_0 A_4$ and $S_1' = \Delta A_3 H_1 A_4$ represent the overall light fluxes corresponding to the band-pass outputs obtained at the focusing and defocusing positions, respectively. It should be assumed that the detection sensitivities or the change ratios of the contrast variation between $S_0$ and $S_1$ and between $S_0'$ and $S_1'$ resulted from defocusing are defined as $K_1 = (S_0 - S_1)/S_0$ and $K_2 = (S_0' - S_1')/S_0'$ ($K_1, K_2 < 1$) respectively. Taking a simple geometrical relation into consideration if $h_0$ and $h_1$ are replaced by $u_a$ and $u_b$ respectively, then $K_1$ and $K_2$ will be expressed by $$K_1 = (u_a - u_b)/u_a \qquad (4)$$

$$K_2 = u_1 (u_a - u_b)/u_b (u_a - u_1) \qquad (5)$$

In order to compare the detection sensitivities at the focusing and defocusing positions with each other, $K_2/K_1$ is calculated as follows:

$$K_2/K_1 = u_a/u_b (1/(1 - u_1/u_a) - 1) \qquad (6)$$

Figure 6:
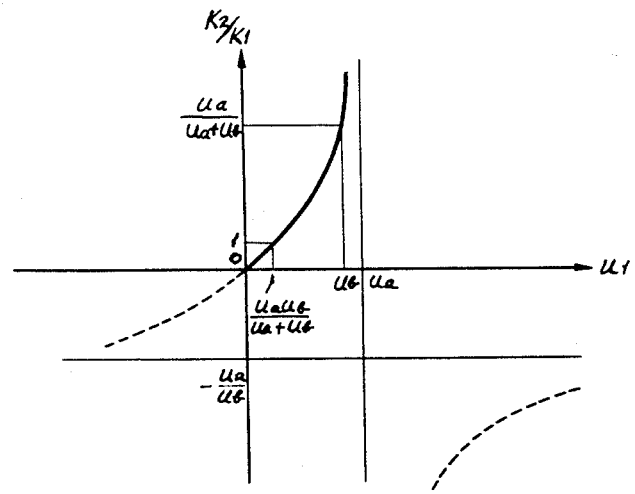
FIG. 6 is a graph plotting the variation in the detection sensitivity at the center frequency $u_1$.

Formula (6) is a function of $u_1$ and the value of $K_2/K_1$ varies along a hyperbola as shown in FIG. 6. As will be clear from the graph if the center frequency $u_1$ is selected to be within the range of $u_a u_b/(u_a + u_b) < u_1 < u_b$, then the relationship of $K_2 > K_1$ will be established and the ratio of $K_2$ to $K_1$ increases sharply as $u_1$ approaches $u_b$. This will be understood also from the fact that the sensitivity $K_2$ for detecting the bandpass output represented by Formula (5) also varies along a hyperbola similar to that of Formula (6) and, as $u_1$ approaches $u_b$, rapidly approaches 1 which is the limit value of the sensitivity defined herein. It will now be appreciated that the defocusing detection can be carried out at a higher sensitivity by extracting only particular spatial frequencies and therefore the method of this invention, wherein the bandpass output from the phase grating is utilized, is very effective.

DESCRIPTION OF THE ILLUSTRATED EMBODIMENTS

Figure 7:
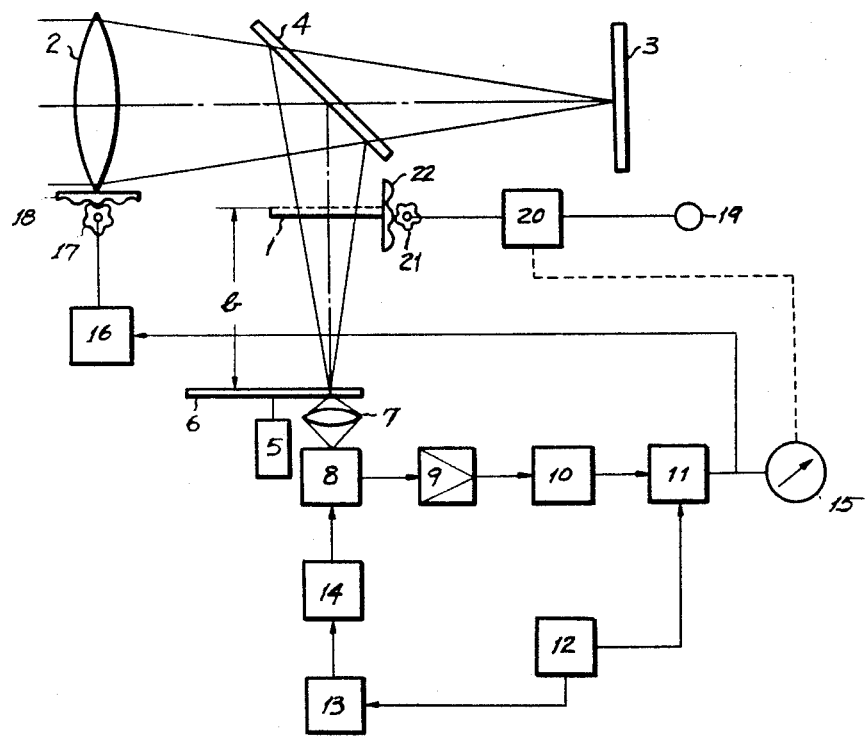
FIG. 7 is a schematic view of the automatic focusing device according to one embodiment of this invention.

Now referring to the accompanying drawing the invention will be described by way of example. Illustrated in FIG. 7 is an automatic focusing device according to one embodiment of this invention. Several servomechanisms are already known for use in an automatic focusing device. They are operative on the basis of some different methods such as phase detection method, voltage comparison method, etc. As these methods are already known, the description will be restricted herein only to a preferred embodiment arranged to operate on the basis of the phase detection method which is the most popular of all the known methods. In the Figure the image of an object is formed by a lens 2 on the film surface 3. On the other hand, a portion of the light which has passed through the lens 2 is reflected by a semitransparent mirror 4 interposed between the lens 2 and film surface 3 and directed through a phase grating 1 onto a photoelectric detector 8 (for example, a photoelectric tube, photocell or phototransistor). Preferably, a light-receiving element having a non-linear characteristic as the photoelectric detector 8 is used. Such a dip-effect element improves the sensitivity of the automatic focusing device. Said semitransparent mirror 4 may be a built-in return mirror in a single-lens reflex camera. The light reflected by the semitransparent mirror 4 is bandpass-filtered by the phase grating 1 which is arranged at right angles to the optical axis and having a bandpass filter effect, and then forms an image in a plane corresponding to the film surface 3. In this image forming plane is arranged a slit disc 6 at right angles to the optical axis. The slit disc 6 can be rotated by a drive unit 5 at a constant speed to thereby scan the image with the slit formed in the disc 6. However, in place of the slit disc 6 an electromagnetic vibrator may also be used for a linear scanning. The width of the slit should be so selected that the OTF thereof has a higher cut-off frequency than the frequency of the image which is to be detected by filtering. The signal resulted from scanning the image by use of the slit disc 6 is condensed by a condenser lens 7 and detected by a photoelectric detector 8 as a time signal. The photoelectric detector 8 is put into simple harmonic motion by a vibrator 14 at a constant period and over a predetermined distance along the optical axis. The simple harmonic motion of the photoelectric detector 8 is under control of an oscillator 12 which acts by way of a drive circuit 13. The vibrator 14 may be an electromagnetic vibrator. In order to modulate the detected image signal, instead of oscillating the photoelectric detector 8, the optical path length between the slit disc 6 and phase grating 1 may be varied, for example, by means of an optical wedge which is so arranged as to perform a simple harmonic motion in a direction perpendicular to the optical axis. This technique will be called herein an optical path length modulation method. The modulated photoelectrically converted output is then amplified by an amplifier 9 and from which a low-frequency component is removed by use of a high-pass filter. The output from the high-pass filter 10 is provided with a bandpass characteristic as mentioned previously.

Figure 8:
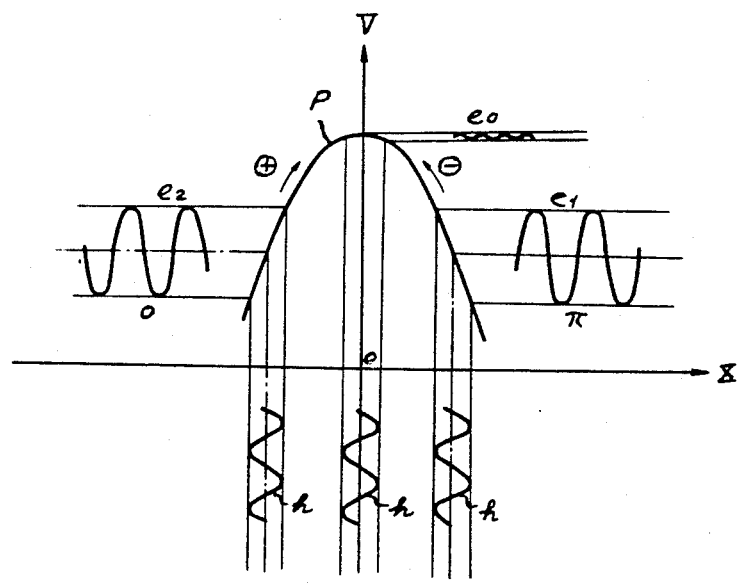
FIG. 8 is a graph for explaining the principle of the servocontrol in accordance with the phase detection method, the graph including the waveforms of the bandpass output voltage at the focusing position and positive and negative defocusing positions.

FIG. 8 illustrates the bandpass output signal V with respect to the defocusing quantity z, wherein curve P representing a band-pass signal which is actually detected at a time when no optical path length modulation has been applied. It will be seen that the band-pass signal varies in correspondence with the variation in the image contrast. When the band-pass signal is subjected to the optical path length modulation the output waveforms obtained at the focusing position, positive defocusing position and negative defocusing position will be $e_0$, $e_1$ and $e_2$, respectively. The simple harmonic motion of the photoelectric detector 8 in the direction along the optical axis is shown by sine wave h. It will be noted that the voltage becomes minimum at the focusing position and the signals obtained at the positive and negative positions are out of phase by $\pi$ from each other. According to the phase detection method the focusing position is determined depending on the level and phase inversion of such an output voltage.

Returning to FIG. 7, the bandpass-filtered signal is phase-detected in a phase detector 11 by use of a reference signal from an oscillator 12 and then converted to either a positive or negative DC voltage depending on whether the defocusing position being positive or negative. The level of the output DC voltage is dependent on the defocusing quantity z. The output from the phase detector 11 is applied to a DC servomotor 16 so that the latter rotates either in the direction indicated by an arrow + or − (FIG. 8) depending on whether the output being positive or negative. It will be seen that the DC servomotor 16 rotates at any time toward the top of the detected signal curve P, that is, toward the focusing position. A pinion 17 is fixed on the shaft of the DC servomotor 16 in such a manner that it engages with a rack 18 attached to the lens 2. In this way the lens 2 is servo-controlled by the phase detection output until it reaches the precise focusing position.

When no modulation is applied, it is generally difficult to determine the focusing position by use of a bandpass output signal P alone. Because, as is clear from FIG. 8, the output signal P has an identical value at the positive and negative defocusing positions and, therefore, the sign of defocusing cannot be determined from this output signal alone. In order to find out the focusing position, it is always essential to compare the voltages obtained at two adjacent defocusing positions with each other. The phase detection method is a well-devised technique to compare the detected voltages with each other in an analog and sequential manner. Of all the known methods it is the best method to attain the rapid and accurate determination of the focusing position.

Figure 2:
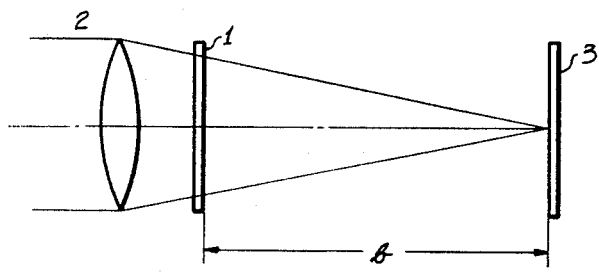
FIG. 2 is a schematic view that is helpful in explaining the optical filtering provided by a diffraction phase grating.

Now with reference to FIG. 7 it will be discussed how the center frequency of said band-pass output can be varied by varying distance b between the phase grating 1 and the slit disc 6 (the slit disc corresponding to the film surface 3 of FIG. 2). As will be clear from Formula (3) the center frequency $u_1 = d/b\lambda$ and the band width $2B = 2a/b\lambda$ of the power spectrum of the optical image detected by the photoelectric detector 8 are reduced, respectively, as the phase grating 1 is shifted toward the lens 2 or to the direction where the distance $b$ increases, so that the triangular wave representing the power spectrum of the image becomes sharper. On the contrary, when the phase grating 1 is shifted toward the slit disc 6 the frequency to be extracted increases and the triangular wave becomes flat.

It should be assumed in FIG. 7 that the lens 2 is in a given defocusing position and the output from the phase detector at this time, that is, the absolute value of the DC voltage is indicated on a voltmeter 15. Upon depression of a push button switch 19 a drive unit 20 starts to rotate a pinion 21 by means of a rack 22 which is in engagement with the pinion 21 and attached to the phase grating 1, so that the phase grating 1 is shifted along the optical axis. Consequently, the indication on the voltmeter 15 varies depending on the spectrum distribution provided by the object to be photographed. The position of the phase grating at which the indication reaches a maximum is the optimum automatic focusing position for the particular object to be photographed. Since the spectrum distribution of an object is dependent in general on the type of the object to be photographed, the ability of varying the frequencies to be extracted increases the flexibility of the automatic focusing device of this invention and allows a high-sensitivity automatic focusing operation for various types of objects.

Figure 9:
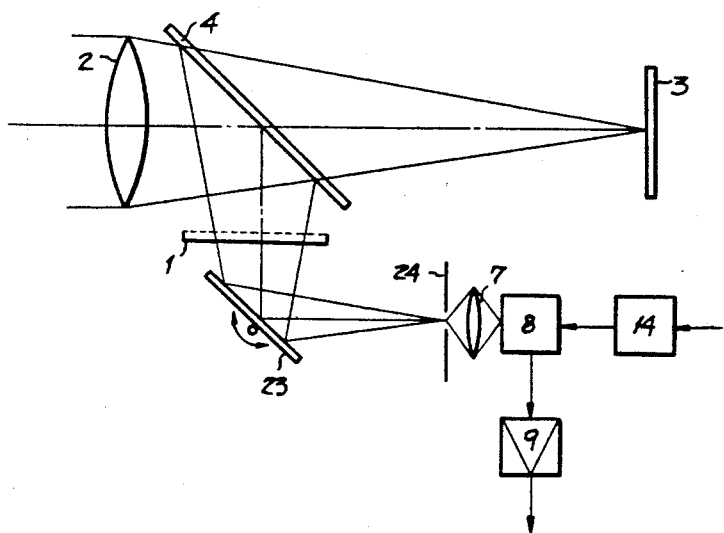
FIG. 9 is a schematic view for explaining a scanning mechanism provided with an oscillating reflecting mirror.

The embodiment has been described as to use a slit disc as a scanning mechanism for the object image. With this technique, however, a large space is occupied by the slit disc and thus the device turns out to be considerably large in size. Instead of shifting the slit itself an image may also be scanned by use of a stationary slit and a reflecting mirror oscillatively arranged in the light path. An automatic focusing device provided with an oscillating reflecting mirror is shown in FIG. 9, wherein the slit disc 6 of FIG. 7 is replaced by an oscillating reflecting mirror 23 and a stationary slit 24 but the other arrangements are all identical with FIG. 7. In FIG. 9 the oscillating reflecting mirror 23 is arranged between the phase grating 1 and the stationary slit plate 24 which is oscillated by a drive unit. This drive unit consists of, for example, a cam and an electric motor for driving the cam at a constant angular speed over a predetermined angle $\pm\theta$. In actual operation, although the angular speed of the reflecting mirror varies incessantly because of its simple harmonic motion, this can be compensated by provision of an excess angle. In this way the image of the object to be photographed is converted into a time signal by use of the photoelectric detector 8 by reciprocally scanning over the stationary slit 24 at a constant speed. The servomechanism for use in the stage subsequent to the photoelectric conversion may be identical with that used in the embodiment of FIG. 7 and hence will not be described any more.

The technique of using an oscillating reflecting mirror permits to reduce the size of the scanning mechanism compared with the embodiment described previously, allowing to make the automatic focusing device compact. In the method of using a stationary slit, said oscillating reflecting mirror may be replaced by any suitable rotatable prism.

It will now be appreciated that the automatic focusing device of this invention is provided with the following characteristics:

First, the use of a diffraction grating with a bandpass effect and of a simple electric high-pass filter allows an easy extraction of particular spatial frequencies contained in the object image, which contributes to achieve a high-sensitivity defocusing detection;

Secondly, the optimum frequencies can be selectively extracted depending on the type of the object to be photographed by shifting the diffraction grating along the optical axis, so that the automatic focusing device of this invention is provided with a wide flexibility; and Thirdly, the use of an oscillating reflecting mirror as a scanning mechanism permits to provide a compact automatic focusing device.

With these characteristic features, the automatic focusing device of this invention has a wide application not only in photographing cameras but also in a variety of other optical apparatuses such as projectors, moving picture equipment, etc.

What is claimed is:

1. Automatic focusing apparatus comprising:
    first means, including a lens, defining an optical path such that at least a portion of light passing through the lens impinges upon a plane, the lens and the plane being movable relative to each other in either of two opposite directions along the optical path, second means, including a photoelectric element responsive to the light impinging upon the plane, for producing an electrical focusing control signal that varies in accordance with the degree of contrast in the light impinging upon the plane, the degree of contrast being maximum for an in-focus spacing between the lens and the plane, third means, for increasing the difference between the degree of contrast obtained at an in-focus spacing and the degree of contrast obtained at an out-of-focus spacing, the third means including an optical transmission function filter comprising a two-dimensional diffraction grating disposed in the optical path and spaced from both the lens and the plane, and the third means further including a scanning mechanism comprising oscillating means and a plate disposed between the grating and the plane and having a slit therethrough through which the light passes in accordance with the oscillating means; and fourth means, responsive to the electrical focusing control signal for adjusting the spacing between the lens and the plane to a relative position that maximizes the degree of contrast.

2. Apparatus according to claim 1 wherein the oscillating means is coupled to rotate the plate about an axis parallel to the path of the light passing through the slit.

3. Apparatus according to claim 1 wherein the oscillating means is coupled to vibrate the plate so that the light passing through the slit is linearly scanned.

4. Apparatus according to claim 1 wherein the first means includes a mirror for reflecting the light toward the plane, and wherein the oscillating means is coupled to the mirror to move it cyclically.

5. Apparatus according to claim 1 further comprising a shifter unit for translating the diffraction grating so as to vary the center frequency of the optical transmission function optical filter and thereby enable higher sensitivity defocusing detection irrespective of the power spectrum distribution of the light passing through the lens.

* * * * *